(12) United States Patent
Huntzicker et al.

(10) Patent No.: US 9,283,856 B2
(45) Date of Patent: Mar. 15, 2016

(54) METHODS, SYSTEMS AND APPARATUS FOR AUTHORIZING OPERATION OF AN ELECTRIC VEHICLE THAT IS BEING CHARGED AT A CHARGING STATION

(71) Applicant: GM GLOBAL TECHNOLOGY OPERATIONS LLC, Detroit, MI (US)

(72) Inventors: Fred W. Huntzicker, Ann Arbor, MI (US); Paul R. Williams, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 105 days.

(21) Appl. No.: 14/187,890

(22) Filed: Feb. 24, 2014

(65) Prior Publication Data

US 2015/0239357 A1 Aug. 27, 2015

(51) Int. Cl.
*G06F 7/00* (2006.01)
*B60L 11/18* (2006.01)
*H04L 29/06* (2006.01)

(52) U.S. Cl.
CPC ......... *B60L 11/1809* (2013.01); *B60L 11/1838* (2013.01); *H04L 63/062* (2013.01)

(58) Field of Classification Search
None
See application file for complete search history.

(56) References Cited

U.S. PATENT DOCUMENTS

| | | | | |
|---|---|---|---|---|
| 7,956,730 B2* | 6/2011 | White et al. | | 340/426.2 |
| 2011/0288891 A1* | 11/2011 | Zaid et al. | | 705/4 |
| 2013/0038424 A1* | 2/2013 | Katar et al. | | 340/5.8 |
| 2014/0002015 A1* | 1/2014 | Tripathi et al. | | 320/108 |
| 2014/0129053 A1* | 5/2014 | Kleve et al. | | 701/2 |
| 2014/0129113 A1* | 5/2014 | Van Wiemeersch et al. | | 701/102 |
| 2014/0303837 A1* | 10/2014 | Tuukkanen | | 701/36 |
| 2015/0142258 A1* | 5/2015 | Sugihara et al. | | 701/32.3 |
| 2015/0149042 A1* | 5/2015 | Cooper et al. | | 701/48 |

OTHER PUBLICATIONS

LeSage, Jon, "Chargepoint's new smartphone app can see 'all'EV charging stations in US," autoblog.com, Dec. 26, 2012, (http://www.autoblog.com/2012/12/26/chargepoints-new-smartphone-app-can-see-all-ev-charging-stati/) accessed: Jul. 31, 2015.*
Huntzicker, F. U.S. Appl. No. 14/091,796, filed Nov. 27, 2013.

* cited by examiner

*Primary Examiner* — Thomas Tarcza
*Assistant Examiner* — Richard Goldman
(74) *Attorney, Agent, or Firm* — Ingrassis Fisher & Lorenz, P.C.

(57) ABSTRACT

Methods and systems are disclosed for authorizing operation of an electric vehicle that is being charged at a charging station. A computer can determine whether predefined criteria relating to the electric vehicle have been satisfied, and, if so, communicates a virtual key to the electric vehicle. The virtual key allows the electric vehicle to be operated in a limited operating mode that defines constraints on operating the vehicle. The virtual key allows the electric vehicle to be operated in the limited operating mode without a physical key or fob being present at the electric vehicle. The electric vehicle includes a processor configured to receive the virtual key and to control operation of the electric vehicle according to the constraints defined by the virtual key.

19 Claims, 3 Drawing Sheets

METHODS, SYSTEMS AND APPARATUS FOR AUTHORIZING OPERATION OF AN ELECTRIC VEHICLE THAT IS BEING CHARGED AT A CHARGING STATION

TECHNICAL FIELD

The technical field generally relates to vehicles, and more particularly relates to methods, systems and apparatus for authorizing operation of an electric vehicle that is being charged at a charging station when the owner is not present.

BACKGROUND

Electric vehicles (EVs) including hybrid electric vehicles have become more popular in recent years. Such electric vehicles must be charged when the charge level of their battery becomes low. Although many people charge their electric vehicles at home, they also oftentimes use shared charging stations to charge their electric vehicle. Unfortunately such charging stations are not readily available. Moreover, even when shared charging stations are available, in many cases they cannot accommodate the demand. The number of electric vehicles that would like to use a station at any given time is greater than the number of available stations.

In addition, because it can take a substantial amount of time (e.g., 3 hours or more for some electric vehicles) to fully charge an electric vehicle, the owner will often leave while the vehicle is charging and may not be present once the electric vehicle is fully charged. Thus, the vehicle may occupy the station for far longer than necessary. This can be frustrating to others who are waiting to charge their electric vehicles.

It would be ideal if the owner who is using the charging station could simply leave their key or fob in the electric vehicle while it is charging so that once it is fully charged anyone who is waiting could move it and use the charging station. However, this is impractical for a number of reasons. For example, the electric vehicle could be moved before it is fully charged, or stolen, etc. As such, most owners are reluctant to do this.

It would be desirable to provide methods, systems and apparatus that allow someone other than the owner of an electric vehicle to operate the vehicle when the owner is not present. Other desirable features and characteristics of the disclosed embodiments will become apparent from the subsequent detailed description and the appended claims, taken in conjunction with the accompanying drawings and the foregoing technical field and background.

SUMMARY

In accordance with an embodiment a method is provided for authorizing operation of an electric vehicle that is being charged at a charging station. In accordance with the method, a computer determines whether predefined criteria relating to the electric vehicle have been satisfied, and communicates a virtual key to the electric vehicle when the predefined criteria are determined to be satisfied. The virtual key allows the electric vehicle to be operated in a limited operating mode that defines constraints on operating the vehicle.

In another embodiment, a system is provided that includes a system is provided that includes a charging station, an electric vehicle that is being charged at the charging station, and a computer associated with the charging station. The computer comprises a processor being configured to determine whether predefined criteria relating to the electric vehicle have been satisfied, and to communicate, when the predefined criteria are determined to be satisfied, a virtual key to the electric vehicle that allows the electric vehicle to be operated in a limited operating mode that defines constraints on operating the vehicle. The virtual key allows the electric vehicle to be operated in the limited operating mode without a physical key or fob being present at the vehicle.

In another embodiment, a computer associated with a charging station is provided. The computer comprises a processor that is configured to generate and communicate a virtual key to an electric vehicle that is being charged at the charging station when predefined criteria relating to the electric vehicle are determined to have been satisfied. The virtual key allows the electric vehicle to be operated in a limited operating mode that defines constraints on operating the vehicle.

In another embodiment, an electric vehicle is provided that includes a processor configured to receive a virtual key from a computer associated with a charging station. The virtual key defines constraints on operating the electric vehicle that allow the electric vehicle to be operated in a limited operating mode. The processor controls operation of the electric vehicle according to the constraints on operating the electric vehicle that are defined by the virtual key.

DESCRIPTION OF THE DRAWINGS

The exemplary embodiments will hereinafter be described in conjunction with the following drawing figures, wherein like numerals denote like elements, and wherein.

DETAILED DESCRIPTION

Various embodiments of the present disclosure are disclosed herein. The disclosed embodiments are merely examples that may be embodied in various and alternative forms, and combinations thereof. The following detailed description is merely exemplary in nature and is not intended to limit the application and uses. The word "exemplary" is used exclusively herein to mean "serving as an example, instance, or illustration." Any embodiment described herein as "exemplary" is not necessarily to be construed as preferred or advantageous over other embodiments. As used herein, for example, "exemplary" and similar terms, refer expansively to embodiments that serve as an illustration, specimen, model or pattern. Furthermore, there is no intention to be bound by any expressed or implied theory presented in the preceding technical field, background, brief summary or the following detailed description.

Overview

Before describing some of the disclosed embodiments, it should be observed that the disclosed embodiments generally relate to methods, systems and apparatus that can allow for an electric vehicle that is being charged at a charging station to be operated in a limited operating mode that defines one or more constraints on operating the vehicle. The disclosed embodiments can be useful, for example, when the owner of an electric vehicle leaves their electric vehicle charging at a charging station and another user would like to access that same charging station, but there is no space and the electric vehicle needs to be moved. The virtual key allows another person to operate the electrical vehicle, when the owner is not present, without possession of an authorized key or fob. As used herein, the "owner" of the vehicle can refer to someone else that the owner of the vehicle has designated as having permission to exercise control over the vehicle.

The methods, systems and apparatus will now be explained below with reference to FIGS. 1-3.

Figure 1:
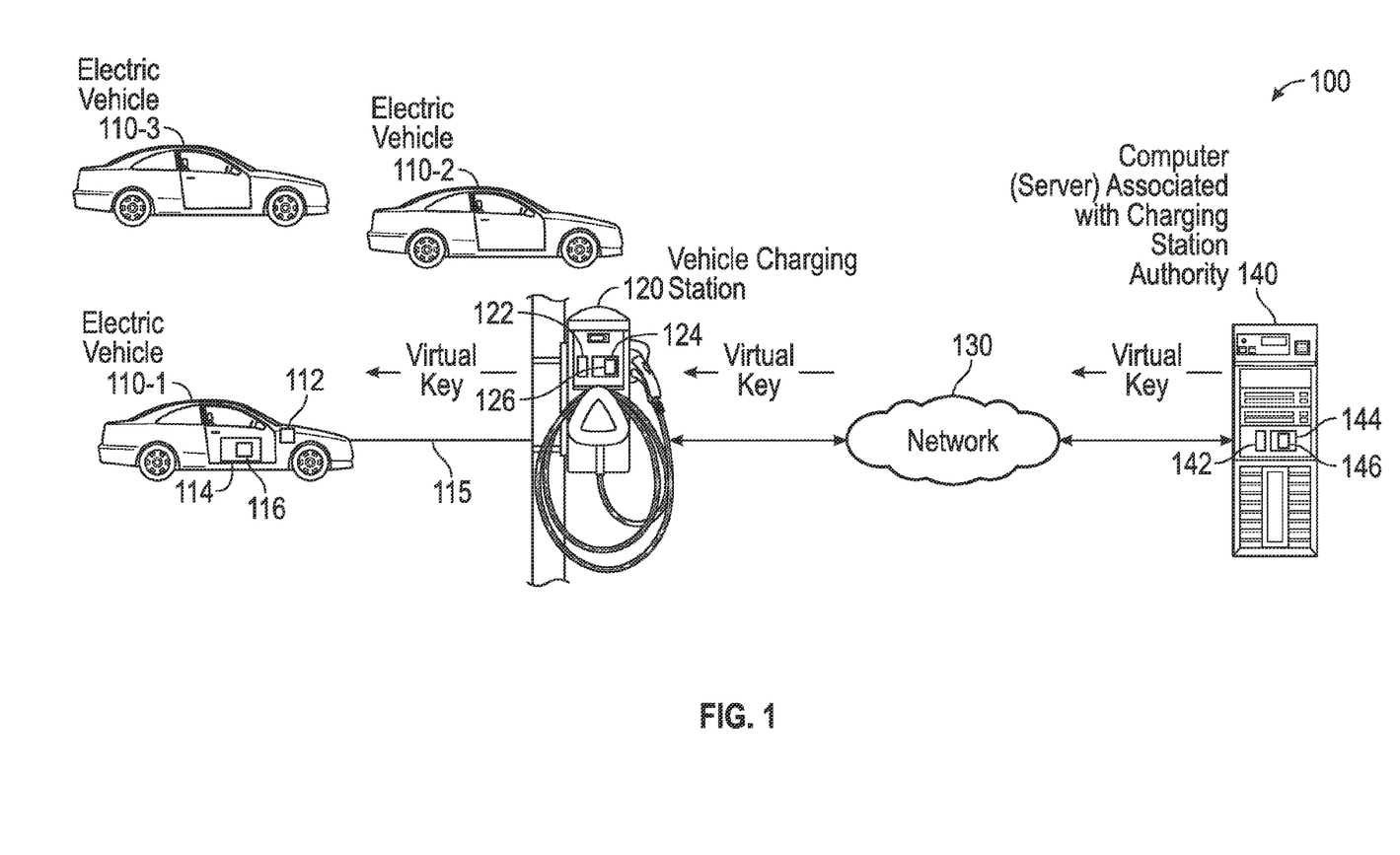
FIG. 1 is an electric vehicle charging system in accordance with some of the disclosed embodiments.

FIG. 1 is an electric vehicle charging system 100 in accordance with some of the disclosed embodiments. The electric vehicle charging system 100 includes a vehicle charging station 120, a computer 140 (e.g., a computer associated with a charging station authority), and a communication network 130 (e.g., the Internet and other peripheral communication networks) that couples the computer 140 to the vehicle charging station 120. FIG. 1 also illustrates electric vehicles 110, where electric vehicle 110-1 is currently connected to and using the vehicle charging station 120 and where electric vehicles 110-2, 110-3 are other vehicles that are not connected to and that are currently waiting to use the vehicle charging station 120. As used herein, the term electric vehicle encompasses any type of vehicle that is capable of being charged at a vehicle charging station including purely electric vehicles and hybrid electric vehicles.

As is known in the art, the electric vehicle 110-1, the vehicle charging station 120, and the computer 140 can include known computer hardware and software that comprises instructions carrying out various steps that are described herein.

The computer hardware can include at least one computer processor 112, 122, 142 (e.g., that includes at least one central processing unit (CPU)) that is in communication with a tangible, non-transitory processor-readable storage medium 114, 124, 144 (e.g., computer memory). The term processor-readable storage medium and variants thereof, as used in the specification and claims, refer to any known non-transitory computer storage media that can include any known form of computer-usable or processor-readable medium. These components are all known in the art and will not be describe in detail herein.

The non-transitory processor-readable storage medium 114, 124, 144 can be any type of memory technology that stores instructions 116, 126, 146 that, when executed by the processor 112, 122, 142, cause the processor 112, 122, 142 to perform various acts as described herein. The instructions 116, 126, 146 may be embodied in the form of one or more programs or applications that may be stored in the medium in one or more modules.

The computer hardware can also include long-range wireless communication interface(s) (e.g., cellular interface), short-range wireless communication interface(s) (e.g., Bluetooth and/or Wireless Local Area Network (WLAN) interface(s)), GPS receiver(s), antenna(s), ports (e.g., USB ports), input/output devices, displays, and audio systems, etc. all of which can be coupled via one or more bus lines to collectively implement any of the functionality described herein. The interfaces allow the computer processor to communicate information with a network 130 either wirelessly or using wired communication links. Each wireless interface includes elements such as a transceiver(s), computer readable medium, processor(s), etc. These components are all known in the art and will not be describe in detail herein.

The network 130 can include a wide area network, such as one or more of a cellular telephone network, the Internet, Voice over Internet Protocol (VoIP) networks, local area networks (LANs), wide area networks (WANs), personal area networks (PANs), and other communication networks. Communications between the electric vehicle 110-1, the vehicle charging station 120 and the computer 140 can traverse through the communication network 130. The computer 140 can be a backend server (or servers) that include computer hardware for implementing the computer 140 that can provide information/content that can then be communicated over a network 130, such as the Internet, to communication infrastructure (not illustrated), the electric vehicle 110-1, and the vehicle charging station 120.

In some embodiments, the computer 140 and communication network 130 can be implemented within the vehicle charging station 120. In other embodiments, the computer 140 and communication network 130 are external to the vehicle charging station 120, and the computer 140 communicates with the vehicle charging station 120 using any known technologies. As such, it will be appreciated that the computer 140 can be implemented, for example, at the charging station 120, or at a remote computer or server associated with the charging station 120, etc.

In addition, although not illustrated in FIG. 1, those skilled in the art will appreciate that the communication network 130 can include (or alternatively be coupled to) communication infrastructure (not illustrated) that allows the electric vehicle 110-1, the vehicle charging station 120, and the computer 140 to communicate information with the communication network 130. For example, the communication infrastructure (not illustrated) allows a Network Access Device (NAD) of the electric vehicle 110-1 to communicate with the external networks and the remotely located computer 140 over wireless communication link(s). The NAD can include at least one communication interface and at least one antenna, and in many cases can include a plurality of different communication interfaces. These communication interfaces can include one or more wireless communication interfaces that allow the embedded NAD to communicate with communication infrastructure that is part of or coupled to the communication network 130. The wireless communication interfaces that are included within the embedded NAD can be implemented using any known wireless communications technologies. Communication infrastructure can generally be any public or private access point that provides an entry/exit point for the NAD to communicate with an external communication network 130 over wireless communication link(s). Depending on the implementation, the communication infrastructure can be a cellular base station, a WLAN access point, a satellite, etc. that is in communication with computer 140 via network 130. Thus, the communication infrastructure can include, for example, long-range communication nodes (e.g., third-generation (3G) or fourth generation (4G) cellular base stations or communication satellites) and shorter-range communication nodes (e.g., WLAN access points) that are communicatively connected to the communication network 130. Communications between NAD and shorter-range communication nodes are typically facilitated using IEEE 802.x or Wi-Fi®, Bluetooth®, or related or similar standards.

In one implementation, the vehicle charging station 120 can be part of a network of vehicle charging stations that are affiliated with a common charging station authority, and the owner of the electric vehicle 110 and the charging station authority can enter into an agreement that authorizes charging stations affiliated with the charging station 120 to communicate information regarding virtual keys. For instance, in one implementation, the owner of the electric vehicle 110 and the charging station authority can enter into an agreement that authorizes the charging station 120 to communicate a virtual key to the electric vehicle 110 (e.g., when one or more predefined criteria are determined to be satisfied).

When the electric vehicle 110 is to be charged, the vehicle charging station 120 is coupled to an electric vehicle 110 via a charging link 115 that charges the electric vehicle 110.

In the non-limiting implementation illustrated in FIG. 1, the computer 140 can communicate a virtual key over the communication network 130 to the vehicle charging station 120, and the vehicle charging station 120 can communicate the virtual key to the electric vehicle 110. However, it is noted that the virtual key can be communicated to the electric vehicle 110 not only by the vehicle charging station 120, but also by any other computer (including the computer 140) over any other communication link (e.g., over a wireless communication link such as a cellular communication link, a WLAN communication link, a Bluetooth communication link, etc.). As will be explained below with reference to FIG. 2, this virtual key allows the electric vehicle 110 to be "operated" in a limited operating mode without a physical key or fob being present at the electric vehicle 110 and even though the owner of the vehicle is not present. In this context, the term "operated" can mean, for example, accessed, turned on and/or moved.

Further details regarding the disclosed embodiments will now be described below with reference to FIGS. 2 and 3.

Figure 2:
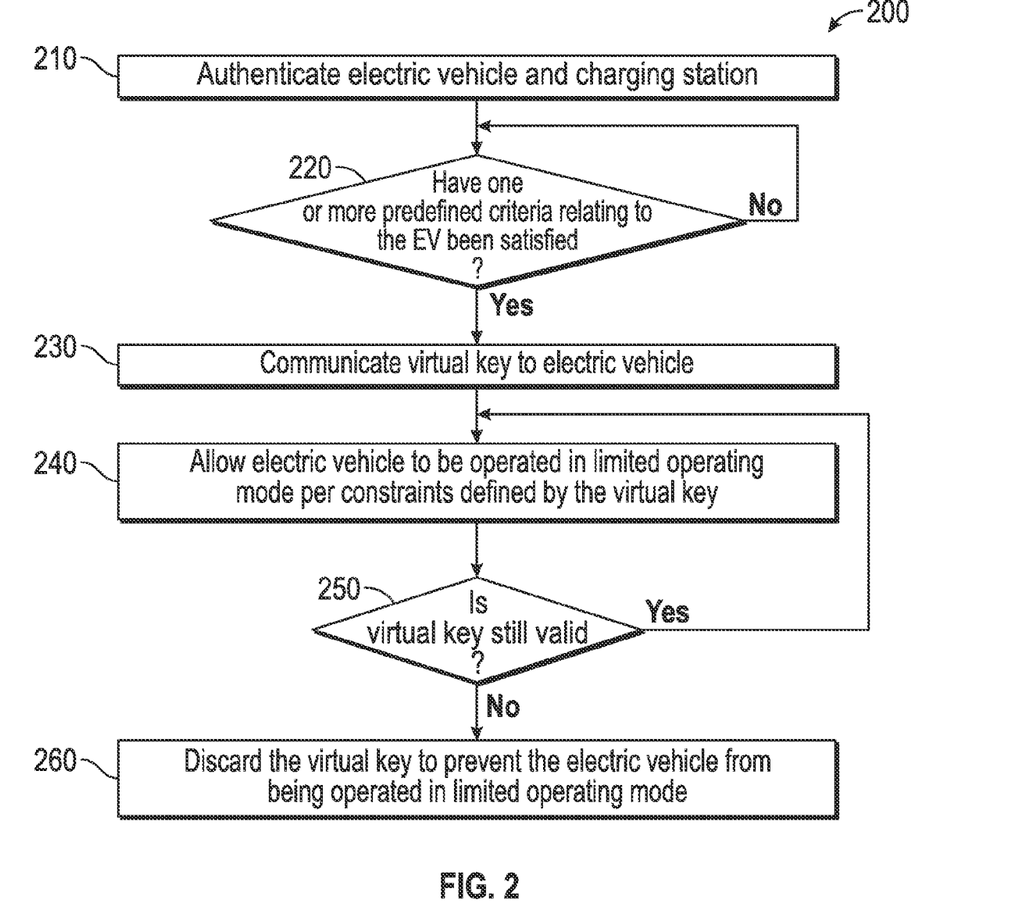
FIG. 2 is a flowchart illustrating a method for authorizing operation of an electric vehicle that is being charged at a charging station in accordance with some of the disclosed embodiments.

FIG. 2 is a flowchart illustrating a method 200 for authorizing operation of an electric vehicle that is being charged at a charging station in accordance with some of the disclosed embodiments. The method of FIG. 2 will be described with reference to FIG. 1. As a preliminary matter, it should be understood that steps of the method 200 are not necessarily presented in any particular order and that performance of some or all the steps in an alternative order is possible and is contemplated. The steps have been presented in the demonstrated order for ease of description and illustration. Further, steps can be added, omitted, and/or performed simultaneously without departing from the scope of the appended claims. It should also be understood that the illustrated method 200 can be ended at any time. In certain embodiments, some or all steps of this process, and/or substantially equivalent steps, are performed by execution of processor-readable instructions stored or included on a processor-readable medium, for example. For instance, references to a processor performing functions of the present disclosure refer to any one or more interworking computing components executing instructions, such as in the form of an algorithm, provided on a processor-readable medium, such as a memory associated with the processor of the onboard computer system (not shown) of electric vehicle, of the vehicle charging station 120 and/or of the computer 140.

The method 200 begins at step 210, where the charging station 120 and the electric vehicle 110 mutually authenticate each other, meaning that the charging station 120 authenticates with the electric vehicle 110, and the electric vehicle 110 authenticates with the charging station 120. The trigger for this authentication process can be, for example, when the electric vehicle 110 connects to the charging station 120, or any other trigger event (e.g., manually by a command from the owner, or automatically at a processor in the charging station in response to an activation event).

As is known to those skilled in the art, authentication involves verifying the validity of at least one form of identification. In accordance with method 200, any known means of mutual authentication can be implemented at step 210.

In one embodiment, digital certificates are exchanged to perform authentication. As is known in the art, a digital certificate (also known as a public key certificate) is an electronic document that uses a digital signature to bind a public key with an identity. In one implementation, the digital certificates can be issued and verified by a Certificate Authority (CA) as part of a public key infrastructure. For example, in one implementation, the electric vehicle 110 authenticates with the charging station 120 via a certificate distributed to the electric vehicle 110 when the owner signed an agreement with the charging station authority. Via the certificate, the charging station 120 verifies that the owner of the vehicle has authorized the electric vehicle 110 to be issued a virtual key when predefined criteria have been satisfied so that the electric vehicle 110 can be operated in a limited operating mode.

In another implementation, the electric vehicle 110 authenticates with the charging station 120 using any known type of cryptographic protocol used to authenticate entities that seek to communicate securely. Such authentication protocols can include exchanging other types of identifiers such as passwords, secret keys, or any other type of shared secret(s) commonly used in authentication techniques, etc.

In another implementation, the electric vehicle 110 authenticates with the charging station 120. In some implementation, the electric vehicle 110 authenticates with the charging station 120 via an input communicated to the charging station 120. The input can be an input at a user interface of an onboard computer that is integrated as part of the vehicle, a voice command received by the onboard computer, an input to a key fob or wireless communication device (e.g., smartphone), an input to a remote computer that is communicatively coupled to the charging station 120, etc.

Although not illustrated in FIG. 2, in some embodiments, the authentication process (at step 210) may also include or be followed by an authorization process. Further, in the event the charging station 120 and the electric vehicle 110 are unable to mutually authenticate each other, then the method 200 either ends or loops at 210 until the charging station 120 and the electric vehicle 110 are able to mutually authenticate each other (not illustrated in FIG. 2).

At step 220, a computer determines whether one or more predefined criteria relating to the electric vehicle 110 have been satisfied. The computer can be implemented anywhere including, for example, at or within the charging station 120, or at any other computer that that is associated with the charging station 120 and that is communicatively coupled with the charging station 120, such as a remote server or other computer.

The predefined criteria relating to the electric vehicle 110 can include that an authorization has been obtained (and optionally that the authorization is still valid) to operate (e.g., access and move) the electric vehicle 110 when it is connected to the charging station 120. In some embodiments, the predefined criteria can also relate to charging status of the electric vehicle 110. For example, the predefined criteria relating to charging status of the electric vehicle 110 can be that the electric vehicle 110 is within a certain percentage of being fully charged (e.g., a percentage between 50% and 100%), and/or that the electric vehicle 110 has been connected to the charging station 120 for a period greater than or equal to a predetermined duration, and/or that the electric vehicle 110 has not been disconnected from the charging station 120 for a period greater than or equal to another predetermined duration. In some embodiments, the predefined criteria can also relate to recent movement status of the electric vehicle 110 after authentication. For instance, the predefined criteria can be determining that the electric vehicle 110 has not been moved in a certain time period after authentication (or can be determining that the electric vehicle 110 has not yet been moved a certain number of times in a certain time period after authentication), and/or can be determining that the electric vehicle 110 has not yet been moved outside a certain area (e.g., as determined by GPS or other means) after authentication.

When one or more of the predefined criteria are not satisfied, a virtual key will not be communicated to the electric vehicle 110 and the method 200 loops back to step 220 (or alternatively back to step 210 for re-authentication).

When the one or more predefined criteria are determined to be satisfied, the method 200 proceeds to step 230. At step 230, a virtual key is communicated to the electric vehicle 110. In this regard, it is noted that the electric vehicle 110 can include an embedded network access device (NAD) that is communicatively coupled to an onboard computer system of the electric vehicle 110, and the embedded NAD can receive the virtual key and communicate it to the onboard computer system. The embedded NAD allows the electric vehicle 110 to communicate information over-the-air using one or more wireless communication links. The embedded NAD allows the onboard computer system of the electric vehicle 110 to exchange information over wide area networks 130, such as the Internet, and to communicate with external networks and infrastructure such as the computer 140 so that they can communicate and share information with each other. The embedded NAD and the onboard computer system can be communicatively coupled over any type of communication link including, but not limited to a wired communication link such as a bus or USB connection, or a wireless communication link such as a Bluetooth communication link or WLAN communication link, etc. In one embodiment, the onboard computer system can be part of an automotive head unit (AHU).

Virtual Key

The virtual key allows the electric vehicle 110 to be operated in a limited operating mode that defines one or more constraints or restrictions on operating the vehicle or regarding operation of the vehicle. As used herein, the term "operated" can mean that the electric vehicle is allowed or permitted to be accessed (e.g., door unlocked and opened), turned on (or started) and/or moved. The constraints or restrictions that are defined by the limited operating mode can vary depending on the implementation. In general terms, the constraints or restrictions can specify any combination of:

- Who is permitted or authorized to operate the electric vehicle 110. For example, only certain authorized persons possessing a credential are permitted to operate the electric vehicle during the limited operating mode. For instance, any person who attempts to operate the electric vehicle 110 is required to present an authentication credential. The authentication credential can be any known type of credential that can be input at the vehicle or the charging station, such as a biometric credentials, a password or passcode, a barcode, a RFID tag, a key or other shared secret communicated from a computer or wireless communication device (e.g., smartphone or key fob), etc.
- When the electric vehicle 110 is permitted to be operated or for how long the electric vehicle 110 is permitted to be operated after the virtual key is communicated to the electric vehicle 110. For example, a maximum time that the electric vehicle 110 is allowed to be moved for after the virtual key is communicated to the electric vehicle 110. To explain further in some embodiments, the virtual key that has been communicated to the electric vehicle 110 is valid for a certain amount of time after it is communicated to the vehicle 110. In one embodiment, the virtual key is only valid for predetermined amount of time and expires when the predetermined time elapses (e.g., expires within a certain period of time after the virtual key is communicated to the electric vehicle 110).
- Conditions that must be satisfied before the electric vehicle 110 is permitted to be operated after the virtual key is communicated to the electric vehicle 110.
- Locations where the electric vehicle 110 is permitted to be operated after the virtual key is communicated to the electric vehicle 110 (e.g., a geographic range (specified by GPS or other coordinates) within the vicinity of the charging station and/or a geographical region or boundaries that the electric vehicle 110 is allowed to be moved within during the limited operating mode).
- A maximum distance from the charging station 120 that the electric vehicle 110 is allowed to be moved (e.g., a certain number of meters that the electric vehicle 110 can be moved away from the charging station during the limited operating mode).
- A maximum speed or acceleration at which the electric vehicle 110 is allowed to be operated at during the limited operating mode.

After the virtual key has been communicated to the electric vehicle 110, the method 200 proceeds to step 240, where the electric vehicle 110 is permitted to be operated in the limited operating mode in accordance with any combination of constraints or restrictions that are defined by the limited operating mode. In one implementation, upon receiving the virtual key, the electric vehicle 110-1 is permitted to be operated by any authorized operator or driver that has authorization credentials that allow them to operate the electric vehicle 110-1. In another implementation, upon receiving the virtual key, the electric vehicle 110-1 is permitted to be operated autonomously via an autonomous vehicle system that performs certain tasks required to move the vehicle 110-1 without a driver by automatically moving and steering the vehicle through an intended trajectory path. The electric vehicle 110-1 includes an onboard computer (e.g., a telematics unit) configured to configured to receive a command to move or park the electric vehicle 110-1 within a parking area in proximity to the vehicle charging station 120. The command can include information that specifies a parking space assignment indicating an assigned parking space within the parking area. The vehicle can include an autonomous vehicle control system configured to control the vehicle to move the vehicle to the assigned parking space within the parking area without a human operator. In one embodiment, the autonomous vehicle system can implement techniques described, for example, in U.S. patent application Ser. No. 14/091,796, filed Nov. 27, 2013 entitled "CONTROLLED PARKING OF AUTONOMOUS VEHICLES," and assigned to the assignee of the present invention, which is incorporated herein by reference in its entirety.

In one embodiment, when the electric vehicle 110-1 is operated, an alert message or messages(s) can be communicated to a computer that is accessible by the owner to notify the owner that the vehicle has been operated. Depending on the owner's preferences, the alert message(s) can be communicated to the owner via e-mail, text or short message service (SMS), or via an automated phone call, for example, using a pre-recorded message. This alert message can include other information such as the current location and/or status of the vehicle (moving, stationary, number of occupants, etc.), the charge state of the vehicle's batteries, etc.

In another embodiment, prior to allowing the electric vehicle 110-1 to be operated at step 240, an alert message or messages(s) can be communicated to a computer that is accessible by the owner to notify the virtual key has been communicated to the electric vehicle 110-1, and requesting authorization message from the owner that allows the vehicle to operated using the virtual key.

If someone attempts to operate the electric vehicle 110 in a manner that is inconsistent with the constraints or restrictions that are defined by the limited operating mode specified in the virtual key, the electric vehicle 110 will not operate. In other words, the virtual key will no longer work with the electric vehicle 110 if someone attempts to operate the electric vehicle 110 outside the constraints or restrictions that are defined by the limited operating mode specified by the virtual key. For instance, if a charging station attendant (or other individual) attempts to drive the electric vehicle 110 at greater than the maximum speed or acceleration, or further than the maximum distance from the charging station 120, the vehicle 110 will cease to operate. As another example, if a charging station attendant (or other individual) attempts to drive the electric vehicle 110 to locations outside where the electric vehicle 110 is permitted to be operated (e.g., locations outside certain geographic boundaries defined with respect to the charging station 120), the vehicle 110 will cease to operate. As another example, if a person attempts to drive the electric vehicle 110, but lacks proper credentials or authorization that are required for permission to operate the vehicle (as specified by the virtual key), the vehicle 110 will not operate. Depending on the implementation, any combination of the constraints or restrictions that are defined above can be required as desired.

At step 250, a processor at the electric vehicle 110 determines whether the virtual key has expired and/or is still valid. When processor determines that the virtual key has not yet expired and/or is still valid, the method loops back to step 240. By contrast, when processor determines that the virtual key has expired or is invalid, the method proceeds to step 260, where the virtual key is discarded (e.g., destroyed, erased or otherwise rendered useless) to prevent the electric vehicle 110 from being operated in the limited operating mode any longer.

Figure 3:
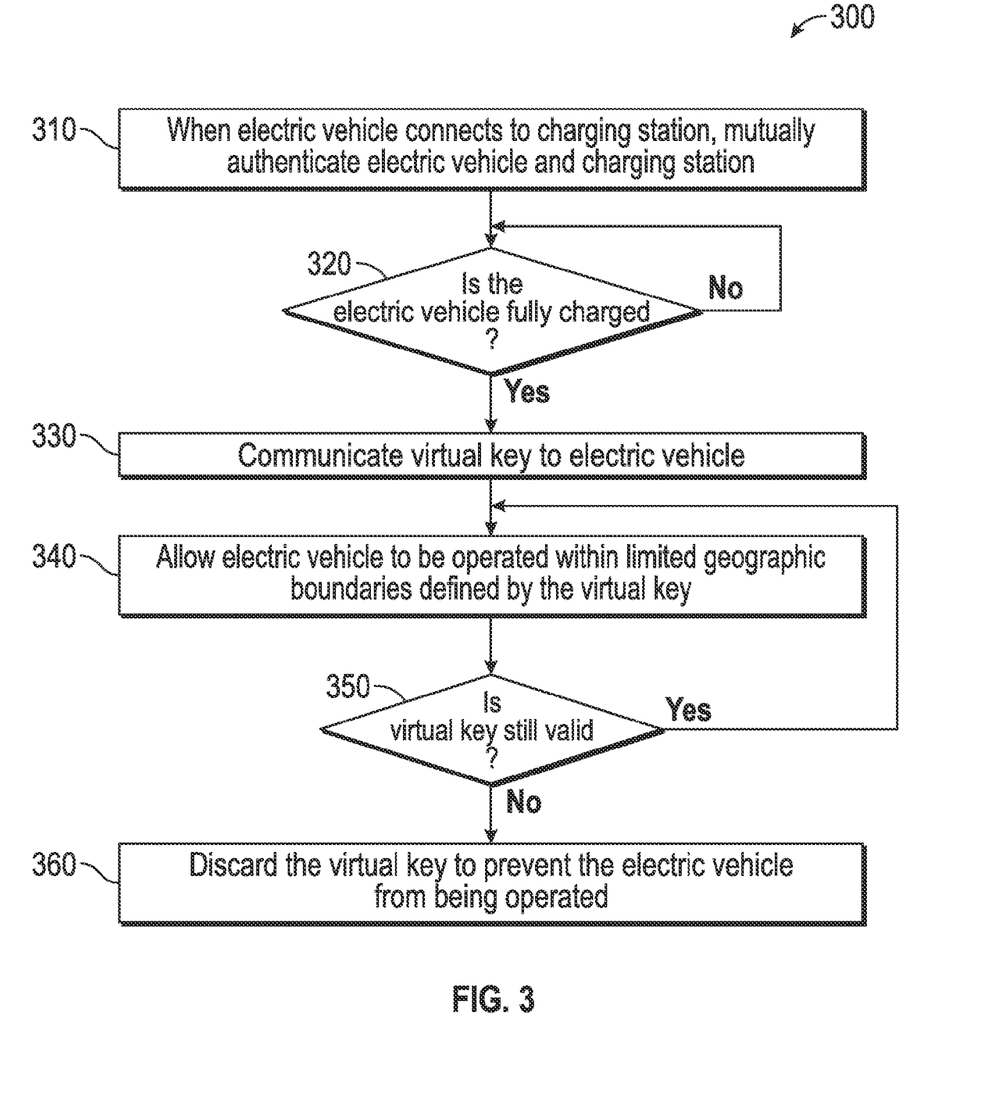
FIG. 3 is a flowchart illustrating a method for authorizing operation of an electric vehicle that is being charged at a charging station in accordance with one exemplary implementation of some of the disclosed embodiments.

To illustrate one exemplary implementation of the method 200 of FIG. 2, a non-limiting example will now be provided with reference to FIG. 3.

FIG. 3 is a flowchart illustrating a method 300 for authorizing operation of an electric vehicle that is being charged at a charging station in accordance with one exemplary implementation of some of the disclosed embodiments.

The method 300 begins when the electric vehicle 110 connects to the charging station 120, and at step 310, the charging station 120 mutually authenticates with the electric vehicle 110.

At step 320, a computer (as described in conjunction with step 220 of FIG. 2) determines whether the electric vehicle 110 is within a certain percentage of being fully charged (e.g., a percentage between 50% and 100%).

When the computer determines that the electric vehicle 110 is not within a certain percentage of being fully charged, the method 300 loops back to step 320 (or alternatively back to step 310 (not illustrated)). When the computer determines that the electric vehicle 110 is within a certain percentage of being fully charged, the method 300 proceeds to step 330. Although not illustrated in FIG. 3, in some implementations of step 320, the computer can also confirm that other pre-defined criteria relating to the electric vehicle 110 have been satisfied prior to proceeding to step 330.

At step 330, a virtual key is communicated to the electric vehicle 110. As noted above, the virtual key allows the electric vehicle 110 to be operated (e.g., accessed, turned on and/or moved) in a limited operating mode, which, in the particular implementation illustrated in FIG. 3, means that the electric vehicle 110 is allowed to be operated within limited geographic boundaries defined by the virtual key. In other words, the virtual key can specify a geographical region or range or boundaries with respect to the charging station 120 (e.g., within the vicinity of the charging station 120) where the electric vehicle 110 is permitted to be operated after the virtual key is communicated to the electric vehicle 110. In one implementation, these geographical boundaries can be specified as a set of GPS coordinates. In other implementations, these geographical boundaries can be specified in terms of a received signal strength indicator (RSSI) or received power level of a signal that is communicated from the charging station 120 or other device within the vicinity of the charging station 120, and received by a communication device implemented within the electric vehicle 110-1. The signal can be any type of wireless communication signal including, for example, a WLAN signal, a Bluetooth signal, a near infrared (IR) signal, an RFID signal, etc. Thus, if the received signal strength indicator (RSSI) or received power level of the signal received by the communication device implemented within the electric vehicle 110-1 is less than a threshold, then it can be assumed that the electric vehicle 110-1 is outside the limited geographic boundaries defined by the virtual key, and the electric vehicle 110-1 will not be permitted to be operated. If the received signal strength indicator (RSSI) or received power level of the signal received by the communication device implemented within the electric vehicle 110-1 is greater than the threshold, then it can be assumed that the electric vehicle 110-1 is within the limited geographic boundaries defined by the virtual key, and the electric vehicle 110-1 will be permitted to be operated.

In one embodiment, the electric vehicle can include a navigation system that can include a global positioning system (GPS) device for establishing a global position of the vehicle, and other information such as heading, speed, acceleration, etc. The GPS device includes a processor and one or more GPS receivers that receive GPS radio signals via an antenna. If someone attempts to move the electric vehicle 110 outside the limited geographic boundaries defined by the virtual key, the electric vehicle 110 will not operate. In other words, the virtual key will no longer work with the electric vehicle 110 if someone attempts to move the electric vehicle 110 outside the limited geographic boundaries defined by the virtual key. In some embodiments, the virtual key that has been communicated to the electric vehicle 110 can be valid indefinitely, but in other embodiments the virtual key is valid under certain constraints (e.g., for a certain amount of time, or until another condition occurs). In one embodiment, the virtual key that has been communicated to the electric vehicle 110-1 is only valid for predetermined amount of time and expires when the predetermined time elapses (e.g., expires within a certain period of time after the virtual key is communicated to the electric vehicle 110-1). In another embodiment, the virtual key that has been communicated to the electric vehicle 110-1 is only valid for during certain times of the day (e.g., when a known attendant is working) and is invalid during other times of the day during which the virtual key can not be used to operate the electric vehicle 110-1 in the limited operating mode that defines constraints on operating the vehicle.

Although not illustrated in FIG. 3, in some implementations of step 330, the virtual key can also define other constraints or restrictions on operating the vehicle or regarding operation of the vehicle; however, for sake of simplicity these are not illustrated in FIG. 3.

After the virtual key has been communicated to the electric vehicle 110, the method 300 proceeds to step 340, where the electric vehicle 110 is permitted to be operated within limited geographic boundaries defined by the virtual key. During this time, at step 350, a processor at the electric vehicle 110 determines whether the virtual key has expired and/or is still valid. When processor determines that the virtual key has not yet expired and/or is still valid, the method loops back to step 340. By contrast, when processor determines that the virtual key has expired or is invalid, the method proceeds to step 360, where the virtual key is discarded (e.g., destroyed, erased or otherwise rendered useless) to prevent the electric vehicle 110 from being operated in the limited operating mode any longer.

The foregoing description has been presented for purposes of illustration and description, but is not intended to be exhaustive or limit the scope of the claims. The embodiments described above are described to best explain one practical application, and to enable others of ordinary skill in the art to understand the invention for various embodiments with various modifications as are suited to the particular use contemplated.

In some instances, well-known components, systems, or methods have not been described in detail in order to avoid obscuring the present disclosure. Therefore, specific operational and functional details disclosed herein are not to be interpreted as limiting, but merely as a representative basis for teaching one skilled in the art.

Those of skill in the art would further appreciate that the various illustrative logical blocks and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The block diagrams in the FIGS. 1-3 illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. It will also be noted that each block of the block diagrams and/or flowchart illustration, and combinations of blocks in the block diagrams can be implemented by special purpose hardware-based systems that perform the specified functions or acts, or combinations of special purpose hardware and computer instructions.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim 1anguage. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim 1anguage and is not logically nonsensical.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The detailed description provides those skilled in the art with a convenient road map for implementing the exemplary embodiment or exemplary embodiments. Many modifications and variations will be apparent to those of ordinary skill in the art without departing from the scope and spirit of the invention. For example, although the description above describes specific implementations of the disclosed embodiments that are used in conjunction with electric vehicles and vehicle charging stations, other implementations are possible in which the virtual key can be used with other types of vehicles to allow a vehicle to be operated in a limited operating mode that defines constraints on operating the vehicle. Examples include vehicles like golf carts (or similar vehicles used in closed communities), two-wheeled personal human transporter apparatus (such as those manufactured by Segway Inc. of New Hampshire, USA, etc.) and the like. Further, the virtual key can also be employed in conjunction with non-electric vehicles in situations where it is desirable to allow the vehicle to be operated in a limited operating mode that defines constraints on operating the vehicle. One such example would be employing the virtual key concept to rental vehicles or at vehicle dealerships so that a vehicle can be operated, for example, within an particular area in the vicinity of the rental facility or dealership.

The above-described embodiments are merely exemplary illustrations of implementations set forth for a clear understanding of the principles of the disclosure. The exemplary embodiments are only examples, and are not intended to limit the scope, applicability, or configuration of the disclosure in any way. While exemplary embodiments have been presented in the foregoing detailed description, it should be appreciated that a vast number of variations exist. Variations, modifications, and combinations may be made to the above-described embodiments without departing from the scope of the claims. For example, various changes can be made in the function and arrangement of elements without departing from the scope of the disclosure as set forth in the appended claims and the legal equivalents thereof All such variations, modifications, and combinations are included herein by the scope of this disclosure and the following claims.

What is claimed is:

1. A method for authorizing operation of an electric vehicle within boundaries that are defined with respect to a charging station that the electric vehicle is being charged at, the method comprising:
   determining, at a computer, whether predefined criteria relating to charging status of the electric vehicle have been satisfied; and
   communicating a virtual key to the electric vehicle when the predefined criteria are determined to be satisfied, wherein the virtual key authorizes operation of the electric vehicle within the boundaries that are defined with respect to the charging station, and allows the electric vehicle to be operated in a limited operating mode that defines constraints on operating the vehicle.

2. The method according to claim 1, wherein the virtual key allows the electric vehicle to be operated in the limited operating mode without a physical key or fob being present at the electric vehicle.

3. The method according to claim 1, wherein the constraints on operating the vehicle specify a maximum distance that the electric vehicle is allowed to be moved during the limited operating mode.

4. The method according to claim 1, wherein the constraints on operating the vehicle specify a maximum speed at which the electric vehicle is allowed to be moved during the limited operating mode.

5. The method according to claim 1, wherein the constraints on operating the vehicle specify a maximum acceleration at which the electric vehicle is allowed to be moved during the limited operating mode.

6. The method according to claim 1, wherein the constraints on operating the vehicle specify a maximum time that the electric vehicle is allowed to be moved for after the virtual key is communicated to the electric vehicle.

7. The method according to claim 1, wherein the constraints on operating the vehicle specify a geographical region or boundaries that the electric vehicle is allowed to be moved within with respect to the charging station during the limited operating mode.

8. The method according to claim 1, wherein the predefined criteria relating to charging status of the electric vehicle is that the electric vehicle is within a certain percentage of being fully charged.

9. The method according to claim 1, wherein the predefined criteria relating to charging status of the electric vehicle is that the electric vehicle has been connected to the charging station for a period greater than or equal to a predetermined duration.

10. The method according to claim 1, wherein the predefined criteria relating to the electric vehicle is that an authorization has been obtained to move the electric vehicle when connected to the charging station.

11. The method according to claim 10, wherein the predefined criteria relating to the electric vehicle are that the authorization has been obtained to move the electric vehicle when connected to the charging station and that the authorization is still valid.

12. The method according to claim 10, wherein an owner of the electric vehicle and a charging station authority enter into an agreement that authorizes the charging station authority to communicate the virtual key to the electric vehicle when the electric vehicle connects to any charging station affiliated with the charging station authority and the predefined criteria are determined to be satisfied.

13. The method according to claim 1, when the electric vehicle connects to the charging station, further comprising:
   authenticating the charging station with the electric vehicle; and
   authenticating the electric vehicle with the charging station.

14. The method according to claim 1, after the virtual key has been communicated to the electric vehicle, further comprising:
   operating the electric vehicle in the limited operating mode.

15. The method according to claim 14, wherein the virtual key is valid for a predetermined time after the virtual key is communicated to the electric vehicle, and wherein the virtual key expires when the predetermined time elapses, and further comprising:
   determining, at the electric vehicle, whether the virtual key has expired.

16. The method according to claim 15, when it is determined that the virtual key has expired, further comprising:
   discarding the virtual key to prevent the electric vehicle from being operated in the limited operating mode.

17. A system for authorizing operation of an electric vehicle within boundaries that are defined with respect to a charging station that the electric vehicle is being charged at, comprising:
   a computer associated with the charging station, the computer comprising a processor being configured to:
      determine whether predefined criteria relating to charging status of the electric vehicle have been satisfied; and
      communicate, when the predefined criteria are determined to be satisfied, a virtual key to the electric vehicle that allows the electric vehicle to be operated in a limited operating mode that defines constraints on operating the vehicle, wherein the virtual key authorizes operation of the electric vehicle within the boundaries that are defined with respect to the charging station, and allows the electric vehicle to be operated in the limited operating mode without a physical key or fob being present at the vehicle.

18. A computer associated with a charging station, the computer comprising:
   a processor that is configured to generate and communicate a virtual key to an electric vehicle that is being charged at the charging station when predefined criteria relating to charging status of the electric vehicle are determined to have been satisfied,
   wherein the virtual key authorizes operation of the electric vehicle within boundaries that are defined with respect to the charging station, and allows the electric vehicle to be operated in a limited operating mode that defines constraints on operating the vehicle.

19. An electric vehicle, comprising:
a processor configured to:
   receive a virtual key from a computer associated with a charging station when predefined criteria relating to charging status of the electric vehicle are determined to have been satisfied, wherein the virtual key authorizes operation of the electric vehicle within boundaries that are defined with respect to the charging station, wherein the virtual key defines constraints on operating the electric vehicle that allow the electric vehicle to be operated in a limited operating mode; and
   control operation of the electric vehicle according to the constraints on operating the electric vehicle that are defined by the virtual key.

* * * * *